Figure 1:
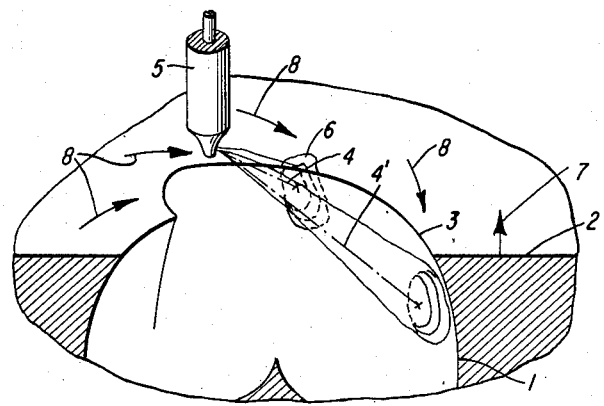

March 21, 1961  J. BÖTTGER  2,975,772
INTERNAL COMBUSTION ENGINE WITH DIRECT FUEL
INJECTION AND COMPRESSION IGNITION
Filed Feb. 21, 1958

INVENTOR
JOSEF BÖTTGER

BY

United States Patent Office 2,975,772
Patented Mar. 21, 1961

2,975,772

INTERNAL COMBUSTION ENGINE WITH DIRECT FUEL INJECTION AND COMPRESSION IGNITION

Josef Böttger, 5 Mezihori, Prague, Czechoslovakia

Filed Feb. 21, 1958, Ser. No. 716,591

Claims priority, application Czechoslovakia Feb. 27, 1957

4 Claims. (Cl. 123—32)

The present invention relates to an internal combustion engine with direct fuel injection and self-ignition and, more particularly, is directed to the arrangement of an injector thereon in relation to the combustion space for ensuring both smokeless and noiseless combustion. The combustion chamber, the axis of which coincides with the axis of the cylinder, is formed either within the piston or cylinder head of the engine and is arranged so that, at the top dead center of the compression stroke, the combustion chamber is almost entirely filled with combustion supporting air, which has been made to rotate around the axis of the chamber in a well known way. The injector is offset from the axis of this combustion chamber and discharges the fuel in at least two jets of different free lengths against the combustion chamber wall. The angles of projection of the jets are selected so that the shortest of the jets first impinges against the chamber wall. Each other jet or jets impinges against the chamber wall at a point which is more remote from the nozzle. The shorter ignition jet impinges, in part, against a location above the upper edge of the combustion chamber, in close proximity to the hottest point of the piston. Each of the jets leaving the nozzle orifice, is partially atomized in the space between the nozzle and wall and partially strikes against the combustion chamber wall. The part of the jet impinging against the combustion chamber wall partly spreads out on the latter, while the remainder rebounds from the wall.

At the present time, various types of noiseless combustion chambers for direct fuel injection are known, for example, spherical chambers with a cylindrical throat arranged in the piston co-axial with the latter. In such combustion chambers it is possible to obtain an almost entirely noiseless burning of a mixture consisting of injected fuel and intensively rotating air. A noiseless combustion is substantially obtained by arranging the fuel jets within the combustion chamber so that, of a number of jets, only one is ignited first, that is, the one jet impinging against the hottest point of the combustion chamber wall. The remaining jets, which have not yet reached the combustion chamber wall ignite at a later point in the operating cycle. With a sufficiently high and properly selected velocity of rotating air, these remaining are ignited by a flame spreading out from the first jet. In known arrangements, the igniting jet enters the combustion chamber in the direction of the incoming air, that is, axially ahead of all the remaining jets, and the flame produced is transmitted by the stream of air to the remaining fuel from the other jets.

The existing engines embodying the self-ignition of only a small portion of the injected fuel and relying upon the flow of air to spread the flame to the other jets, have constructional drawbacks. The known combustion chamber for such a combustion process is relatively deep and requires a piston having a large axial length. Such pistons uselessly increase engine weight, and this is particularly uneconomical with the engines having a high stroke/bore ratio, as is necessary for obtaining the high air velocities needed to mix the air and fuel.

The present invention removes this inherent drawback of known combustion chambers and fuel jet arrangements and insures gradual burning of the fuel after ignition of the mixture in a restricted small area, while employing substantially flatter, that is, lower, combustion chambers. Thus engine weight is reduced and more favourable stroke/bore ratios may be used without affecting the optimum velocity of inflowing air required for perfect burning of the fuel.

According to the present invention, the above advantages are achieved by a novel arrangement of the fuel jets within a particularly shaped combustion chamber based upon the following experimentally verified criteria. Thus, it has been found that a fuel jet is ignited most rapidly after impingement against the combustion chamber wall:

(a) If the jet core impinges against the combustion wall surface in close proximity to the edge of the latter at its hottest point;

(b) If a small portion of the jet skirt is sprayed over this edge;

(c) If this sprayed-over portion of the jet skirt impinges against a surface which is differently inclined with respect to the combustion chamber wall; and (d) If the direction of the air flow for this jet portion is also changed.

The remaining jet or jets, that is, the jet or jets other than the igniting jet, are located in accordance with the present invention on the basis of the experimentally confirmed knowledge that a fuel jet hitting a hot wall, is self-ignited only after covering a certain path along this wall. It must be added that the fuel spreads over the wall only as long as the injection takes place. Once the injection is concluded, the spreading of the fuel over the combustion chamber wall is interrupted. The interval during which self-ignition of the fuel jet sprayed within a rotating air stream against the combustion chamber wall takes place, is thus dependent both upon the overall length or duration of the discharge and the free jet length between the nozzle orifice and the point of impingement against the combustion chamber wall. It has been experimentally confirmed that smokeless fuel combustion in a jet is possible only if the jet has a sufficient free length and if its core does not cover the combustion chamber wall from too close proximity. Otherwise, soot always forms in the exhaust gases even with an intensive air rotation along the walls of the combustion chamber, as the air is obviously carrying only atomized or vaporized fuel and not that portion of fuel which is spread over the wall. If the nozzle orifice is too close to the wall, the area of the wall covered by the jet core has too much fuel thereon and this results in self-ignition at more than one point and imperfect combustion of the fuel, as evidenced by smoke in the exhaust.

According to the present invention, a part of the fuel jet is sprayed over the combustion chamber wall edge and a small portion of the fuel which is more thoroughly atomized than that within the jet core first impinges against a surface of different inclination, but having a high temperature similar to that of the combustion chamber edge, so that, at the point where fuel is sprayed over the edge, the air is saturated with fuel required for earliest possible self-ignition by the action of the radial component of the air stream.

The inclination of the surface beyond the edge of the combustion chamber wall causes an accumulation of fuel vapors to take place owing to the radial component of air stream. Such a local accumulation effectively aids cold-starting. The remainder of the fuel from the igniting jet, particularly its core, impinges against the wall of the combustion chamber itself and, after impingement, it spreads over regions of the wall having lower temperatures, whereby the possibility of self-ignition of this portion of the fuel is diminished. In this way it is made certain that self-ignition takes place only in a limited portion of the ignition jet which is better atomized and which is taken from the jet skirt sprayed over the combustion chamber edge. This small self-ignited portion of fuel of the ignition jet is carried by the radial component of the air stream, which is directed inwardly towards the end of the compression stroke, into the combustion chamber below the wall edge, where it causes ignition of a further portion of the fuel of the igniting jet. Owing to burning and air movement, the flame is gradually carried to the other jets. Self-ignition in such other jet or jets is prevented by providing the latter with a greater free length than the igniting jet and by directing the other jet or jets so that they are not sprayed over the combustion chamber edge, that is, the hottest point, but are directed against points having lower temperatures.

Figure 2:
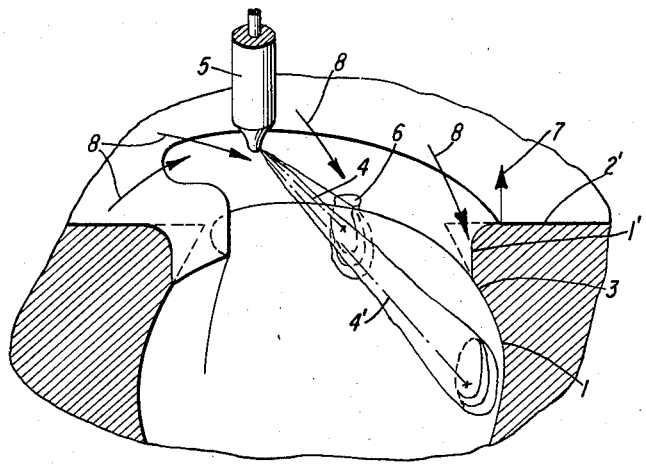

The above, and other objects, features and advantages of the invention, will be apparent in the following detailed description of illustrative embodiments thereof which is to be read in connection with the accompanying drawing, wherein:

Fig. 1 is a diagrammatic perspective view, partly in section, of the top portion of a piston embodying the invention; and Fig. 2 is a view similar to that of Fig. 1, but showing another embodiment.

Referring to Fig. 1, it will be seen that, in accordance with the invention, fuel jets 4, 4' impinge against a combustion chamber wall 1 which directly forms an acutely angled edge 3 with the piston top surface 2, that is, without any transition curve therebetween. Injector 5 discharges the two jets 4, 4', and the centerlines of the latter are represented by dashed lines. The ignition jet 4, which has the shorter free length and first impinges against the wall 1, has a part of its skirt sprayed against the margin or edge 3 of the combustion chamber, and beyond the edge 3 onto the piston top 2, as indicated by the reference numeral 6. The core of this first jet 4 slides—while the piston is still performing its compression-stroke in the direction of the arrow 7—as rebound fuel which, aided by the air movement, spreads along the combustion chamber wall 1 in the direction towards the combustion chamber bottom.

According to the invention it is desirable not to dispose the jets 4, 4' discharged successively from the nozzle 5 in a plane formed by the air stream, but rather to arrange them so as to avoid the overlapping of the jets. Thus, an excessive concentration of fuel at some points of the combustion chamber is avoided and adverse phenomena originating from such concentration are eliminated. A stated above, only the part 6 of the jet 4 sprayed over the combustion chamber wall edge 3 is self-ignited at the point of entry of air flowing from the cylinder space into the combustion chamber approximately in the direction of the arrows 8, and the resulting flame first ignites the rest of the jet 4 and then also the fuel from the jet 4'. This causes successive burning of all the fuel injected, in jets of different free lengths, into the combustion chamber. The free lengths of jets 4, 4', as well as the angle of projection between them, must be selected so that the maximum amount of injected fuel approximately suits the stoichiometric ratio of air drawn into the cylinder. In this way it is possible to obtain complete combustion at a velocity of rotating air, which is adequate for given sizes of the combustion chamber, even at a minimum excess of air.

Fig. 2 shows another embodiment of the invention in which the jets 4, 4' are similarly arranged with respect to the combustion chamber wall edge 1, but in which the combustion chamber is provided with an orifice 1' between the wall 1 of the combustion chamber and top surface 2 of the piston. Even when the part 6 of the jet is sprayed on to the orifice 1', the change of the direction of the inflowing air, as indicated by the arrows 8, causes the above mentioned fuel concentration at the combustion chamber edge 3 and facilitates self-ignition of this fuel portion. In the embodiment according to Fig. 2, the ignition jet is not sprayed over the top surface 2 of the piston, but only partly onto the interconnecting orifice 1', and the rest of the jet is directed into the combustion chamber itself. The arrangement of Fig. 2 achieves the same effect as in case of the previously described construction of Fig. 1.

For easy engine starting the arrangement according to this invention offers another advantage, in that the longer jet 4' strikes the wall 1 a certain time interval after the jet 4 strikes the wall. The angle of projection of this long jet may be selected, in relation to the combustion chamber axis so that the skirt of jet 4' touches a so-called "dead zone," that is a region without air movement, where there is the highest compression heat, which is of importance for easy starting during cold weather. During cold starting, as distinguished from normal starting conditions, the fuel in the free length of the skirt portion of the long jet is first ignited with a longer time delay, only after the end of injection. Under such conditions the fuel jet remains almost immovable within the free combustion chamber space, because at the low starting speed the air-movement velocity within the combustion chamber is negligible, and the jet is not influenced by this movement.

The arrangements described above achieve a combustion corresponding to that in engines with igniting devices, such as, spark plugs. From the point of view of engine noise and smokeless operation, the engine according to the present invention is practically equal to gas engines.

What I claim is:

1. In a cylinder arrangement of an internal combustion engine of the kind having a cylinder, a piston movable in said cylinder, direct fuel injection at the end of the compression stroke of the piston when the contents of the interior of the cylinder are nearly all combustion supporting air rotating within the cylinder, and wherein self-ignition of the injected fuel is effected; the combination of wall means at one end of said piston defining a combustion space having the shape of a body of revolution which is symmetrical with respect to the axis of said cylinder and which opens into said interior of the latter past an edge of said wall means, and an injection nozzle offset with respect to the central axis of said combustion space and having a plurality of nozzle orifices discharging jets of fuel into said combustion space along paths having different lengths between said orifices and said wall means, the shortest of said paths being disposed in relation to said wall means so that an outer portion of the related fuel jet passes beyond said edge of the combustion space wall means while the remainder of said jet having the shortest path impinges against said wall means immediately adjacent said edge, and each of the remainder of said jets impinging exclusively against said wall means of the combustion space at a location further removed from said edge.

2. In a cylinder arrangement of an internal combustion engine, the combination as in claim 1; wherein said nozzle orifices are arranged so that the fuel jets discharged therefrom extend in the general direction of the rotation of the combustion supporting air, and the nozzle orifice discharging the fuel jet having the longest path is disposed to cause an outer portion of the related fuel jet to pass adjacent the central axis of said combustion space where the flow of air is negligible.

3. In a cylinder arrangement of an internal combustion engine, the combination as in claim 1; wherein said one end of the piston has a flat surface, with said edge of the wall means of the combustion space defining the demarkation between said wall means and said flat surface so that said portion of the jet having the shortest path and which passes beyond said edge impinges against an area on said flat surface immediately adjacent said edge.

4. In a cylinder arrangement of an internal combustion engine, the combination as in claim 1; wherein said one end of the piston has a flat surface and an intermediate surface extending from said edge of the wall means of the combustion space to said flat surface, with said intermediate surface having a different inclination relative to said flat surface than said wall means adjacent said edge, so that said portion of the jet having the shortest path and passing beyond said edge impinges against said intermediate surface.

References Cited in the file of this patent

UNITED STATES PATENTS

| | | |
|---|---|---|
| 2,777,430 | Meurer | Jan. 15, 1957 |
| 2,837,068 | Lang | June 3, 1958 |